US009448808B2

(12) United States Patent
Maity et al.

(10) Patent No.: US 9,448,808 B2
(45) Date of Patent: Sep. 20, 2016

(54) BIOS UPDATE WITH SERVICE PROCESSOR WITHOUT SERIAL PERIPHERAL INTERFACE (SPI) ACCESS

(71) Applicant: AMERICAN MEGATRENDS, INC., Norcross, GA (US)

(72) Inventors: Sanjoy Maity, Snellville, GA (US); Baskar Parthiban, Johns Creek, GA (US); Satheesh Thomas, Norcross, GA (US); Purandhar Nallagatla, Johns Creek, GA (US); Ramakoti Reddy Bhimanadhuni, Suwanee, GA (US); Harikrishna Doppalapudi, Norcross, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 357 days.

(21) Appl. No.: 14/090,393

(22) Filed: Nov. 26, 2013

(65) Prior Publication Data

US 2015/0149750 A1    May 28, 2015

(51) Int. Cl.
| | | |
|---|---|---|
| *G06F 9/00* | (2006.01) | |
| *G06F 15/177* | (2006.01) | |
| *G06F 9/44* | (2006.01) | |
| *G06F 9/445* | (2006.01) | |

(52) U.S. Cl.
CPC ............. *G06F 9/4406* (2013.01); *G06F 8/665* (2013.01)

(58) Field of Classification Search
CPC ...................................................... G06F 9/4406
USPC ........................................................ 713/1, 2
See application file for complete search history.

(56) References Cited

U.S. PATENT DOCUMENTS

| | | | |
|---|---|---|---|
| 6,944,758 B2 | 9/2005 | Lin | |
| 7,043,666 B2 | 5/2006 | Wynn et al. | |
| 7,765,393 B1 | 7/2010 | Lee et al. | |
| 7,809,836 B2 * | 10/2010 | Mihm | G06F 8/65 709/227 |
| 2003/0076311 A1 | 4/2003 | Lin et al. | |
| 2004/0153738 A1 | 8/2004 | Otaka et al. | |
| 2004/0193862 A1 | 9/2004 | Lin | |
| 2010/0228960 A1 * | 9/2010 | Huang | G06F 8/65 713/100 |
| 2012/0110562 A1 * | 5/2012 | Heinrich | G06F 8/65 717/169 |
| 2015/0081829 A1 | 3/2015 | Maity et al. | |
| 2015/0143095 A1 | 5/2015 | Maity et al. | |
| 2015/0149750 A1 | 5/2015 | Maity et al. | |

* cited by examiner

*Primary Examiner* — Zahid Choudhury

(74) *Attorney, Agent, or Firm* — Locke Lord LLP; Tim Tingkang Xia, Esq.

(57) ABSTRACT

Certain aspects direct to BIOS update with a service processor (SP) without access through a serial peripheral interface (SPI). In certain embodiments, the system includes a SP, which includes a processor, a non-volatile memory, a volatile memory and a system interface. The SP receives a BIOS image from a remote management computer, and stores the BIOS image in the volatile memory. When the SP receives, from a BIOS executed at a central processing unit (CPU) of a host computer through the system interface, a request for the BIOS image, the SP sends a copy of the BIOS image in response to the request for the BIOS image to the host computer through the system interface such that the BIOS executed at the CPU of the host computer replaces a current BIOS image stored in a BIOS chip with the copy of the BIOS image.

18 Claims, 6 Drawing Sheets

BIOS UPDATE WITH SERVICE PROCESSOR WITHOUT SERIAL PERIPHERAL INTERFACE (SPI) ACCESS

FIELD

The present disclosure relates generally to basic input/output system (BIOS) update of a host computer with a service processor (SP), and particularly to BIOS update with a SP without access through a serial peripheral interface (SPI).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The Basic Input/Output System (BIOS) is one of the most crucial components on a computer motherboard. The BIOS firmware is preloaded into a memory (the BIOS memory) of the BIOS, and typically is the first code run by a computer when powered on. When the computer starts up, the first job for the BIOS is the power-on self-test, which initializes and identifies the system devices such as the CPU, RAM, video display card, keyboard and mouse, hard disk drive, optical disc drive and other hardware. The BIOS then locates a boot loader software held on a peripheral device (designated as a "boot device"), such as a hard disk or a CD/DVD, and loads and executes that software, giving it control of the operating system (OS). This process is known as booting, or booting up, which is short for bootstrapping.

The BIOS memory for storing the BIOS firmware is generally a non-volatile chip, such as an EEPROM chip on the motherboard. Typically, a serial peripheral interface (SPI) bus is used for the EEPROM chip. In modern computer systems, contents stored in the BIOS chip can be rewritten without removing it from the motherboard, allowing the BIOS firmware to be upgraded in place. The rewriting process of the BIOS firmware is generally referred to as flashing the BIOS.

Generally, a service processor (SP) or a baseboard management controller (BMC) refers to a specialized microcontroller that manages the interface between system management software and platform hardware. The SP can be embedded on the motherboard of a computer, generally a server. For example, different types of sensors can be built into the computer system, and the SP reads these sensors to obtain parameters such as temperature, cooling fan speeds, power status, operating system (OS) status, etc. The SP monitors the sensors and can send alerts to a system administrator via the network if any of the parameters do not stay within preset limits, indicating a potential failure of the system. The administrator can also remotely communicate with the BMC to take some corrective action such as resetting or power cycling the system to get a hung OS running again. The SP also provides out-of-band (OOB) access to the BIOS.

In a host computer provided with a SP, the SP can be used for flashing the BIOS. Generally, the administrator may upload a BIOS firmware image to the host computer through the OOB access of the SP, and the SP may control the host computer to enter a special state to write the BIOS firmware image to the BIOS chip through the BIOS serial peripheral interface (SPI). However, not all computer systems have the hardware capability for the SP to access the SPI directly. There is a need for the SP to update the BIOS firmware image without the SPI access.

Therefore, an unaddressed need exists in the art to address the aforementioned deficiencies and inadequacies.

SUMMARY

Certain aspects of the present disclosure direct to a system, which includes a service processor (SP). In certain embodiments, the SP includes a processor, a non-volatile memory, a volatile memory and a system interface. The non-volatile memory stores computer executable codes, when executed at the processor, are configured to: receive a basic input/output system (BIOS) image from a remote management computer, and store the BIOS image in the volatile memory; receive, from a BIOS being executed at a central processing unit (CPU) of a host computer through the system interface, a request for the BIOS image; and in response to the request for the BIOS image, send a copy of the BIOS image to the host computer through the system interface such that the BIOS being executed at the CPU of the host computer replaces a current BIOS image stored in a BIOS chip of the host computer with the copy of the BIOS image.

In certain embodiments, the system interface is a standardized interface under an Intelligent Platform Management Interface (IPMI) standard. In certain embodiments, the standardized interface includes a keyboard controller style (KCS) interface, a system management interface chip (SMIC) interface, and a block transfer (BT) interface.

In certain embodiments, the system interface is a universal serial bus (USB) interface.

In certain embodiments, the SP is a baseboard management controller (BMC).

In certain embodiments, the host computer includes: the BIOS chip storing the current BIOS image; a memory; and the CPU, configured to load a copy of the current BIOS image to the memory and execute the current BIOS image as the BIOS. In certain embodiments, the BIOS, when executed at the CPU, is configured to: generate a first IPMI original equipment manufacturer (OEM) message as the request for the BIOS image, and send the request for the BIOS image to the SP via the system interface; receive the copy of the BIOS image from the SP via the system interface, and stores the copy of the BIOS image in the memory; and replace the current BIOS image stored in the BIOS chip with the copy of the BIOS image stored in the memory.

In certain embodiments, the BIOS, when executed at the CPU, is configured to receive the copy of the BIOS image from the SP by: receiving a second IPMI OEM message from the SP via the system interface; and retrieving the copy of the BIOS image from the second IPMI OEM message.

In certain embodiments, the codes are configured to send the copy of the BIOS image to the host computer by: generating the second IPMI OEM message comprising the copy of the BIOS image; and sending the second IPMI OEM message to the host computer via the system interface.

In certain embodiments, the BIOS, when executed at the CPU, is further configured to: generate a request for version information of the BIOS image, and send the request for the version information of the BIOS image to the SP through the system interface; receive, from the SP via the system interface, the version information of the BIOS image; and compare the version information of the BIOS image to a version information of the current BIOS image.

In certain embodiments, the codes are further configured to: receive, from the BIOS being executed at the CPU of the host computer through the system interface, the request for the version information of the BIOS image; in response to the request for the version information, retrieve the version information from the BIOS image stored in the volatile memory; and send the version information to the host computer via the system interface.

In certain embodiments, the request for the version information of the BIOS image is a third IPMI OEM message, and the version information of the BIOS image is a fourth IPMI OEM message.

Certain aspects of the present disclosure direct to a method of updating a basic input/output system (BIOS) of a host computer with a service processor (SP), including: receiving, at the SP, a BIOS image from a remote management computer, and storing the BIOS image in a volatile memory of the SP; receiving, at the SP, a request for the BIOS image from a BIOS being executed at a central processing unit (CPU) of the host computer through a system interface; and in response to the request for the BIOS image, sending, at the SP, a copy of the BIOS image to the host computer through the system interface such that the BIOS being executed at the CPU of the host computer replaces a current BIOS image stored in a BIOS chip of the host computer with the copy of the BIOS image.

In certain embodiments, the SP is a baseboard management controller (BMC).

In certain embodiments, the request for the BIOS image is a first IPMI original equipment manufacturer (OEM) message.

In certain embodiments, the SP is configured to send the copy of the BIOS image to the host computer by: generating a second IPMI OEM message comprising the copy of the BIOS image; and sending the second IPMI OEM message to the host computer via the system interface.

In certain embodiments, the method further includes: receiving, at the SP, a third IPMI OEM message as a request for the version information of the BIOS image from the BIOS being executed at the CPU of the host computer through the system interface; in response to the request for the version information, retrieving, at the SP, the version information from the BIOS image stored in the volatile memory; and sending, at the SP, the version information as a fourth IPMI OEM message to the host computer via the system interface.

Certain aspects of the present disclosure direct to a non-transitory computer readable medium storing computer executable codes. The codes, when executed at a processor, are configured to: receive a basic input/output system (BIOS) image from a remote management computer, and store the BIOS image in a volatile memory of a service processor (SP); receive a request for the BIOS image from a BIOS being executed at a central processing unit (CPU) of a host computer through a system interface; and in response to the request for the BIOS image, send a copy of the BIOS image to the host computer through the system interface such that the BIOS being executed at the CPU of the host computer replaces a current BIOS image stored in a BIOS chip of the host computer with the copy of the BIOS image.

In certain embodiments, the SP is a baseboard management controller (BMC).

In certain embodiments, the request for the BIOS image is a first IPMI original equipment manufacturer (OEM) message.

In certain embodiments, the codes are configured to send the copy of the BIOS image to the host computer by: generating a second IPMI OEM message comprising the copy of the BIOS image; and sending the second IPMI OEM message to the host computer via the system interface.

In certain embodiments, the codes are further configured to: receive a third IPMI OEM message as a request for the version information of the BIOS image from the BIOS being executed at the CPU of the host computer through the system interface; in response to the request for the version information, retrieve the version information from the BIOS image stored in the volatile memory of the SP; and sending the version information as a fourth IPMI OEM message from the SP to the host computer via the system interface.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
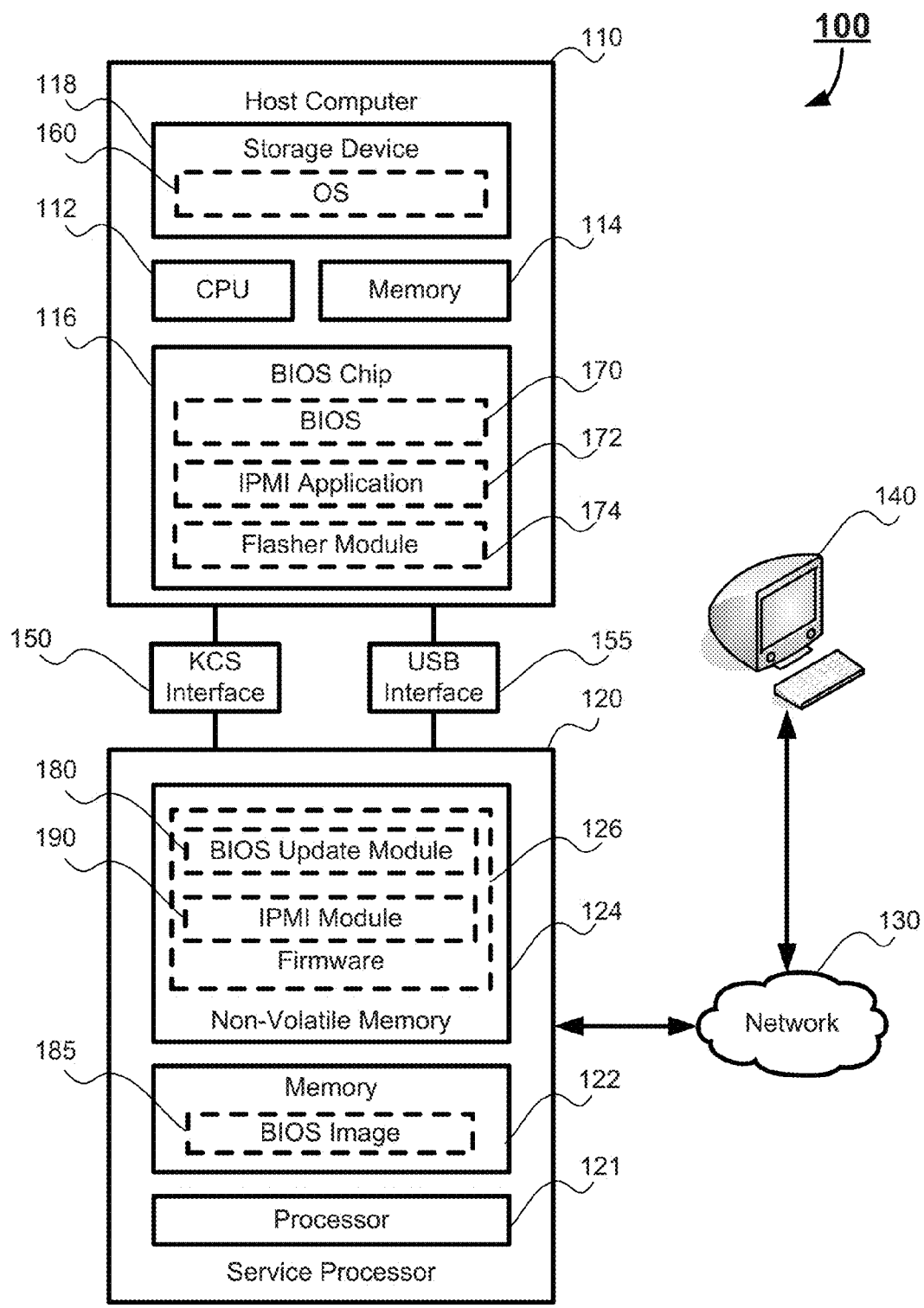
FIG. 1 schematically depicts a computer system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

FIG. 1 schematically depicts a computer system according to certain embodiments of the present disclosure. As shown in FIG. 1, the computer system 100 includes a host computer 110 and a service processor (SP) 120. The SP 120 is connected to the host computer 110 via a keyboard controller style (KCS) interface 150 and a universal serial bus (USB) interface 155. Further, a remote management computer 140 is connected to the SP 120 via a network 130. The system 100 can be a system that incorporates more than one interconnected system, such as a client-server network. The network 130 may be a wired or wireless network, and may be of various forms such as a local area network (LAN) or wide area network (WAN) including the Internet. In certain embodiments, the system 100 may include other physical or virtual components not shown in FIG. 1.

In certain embodiments, the SP 120 may be connected to the host computer 110 via only one of the KCS interface 150 and the USB interface 155. For example, the SP 120 may be connected to the host computer 110 via only the KCS interface 150, or via only the USB interface 155.

In certain embodiments, the SP 120 may be connected to the host computer 110 via one or more interfaces replacing or in addition to the KCS interface 150 and the USB interface 155. For example, the BMC 120 may be connected to the host computer 110 via other typical standardized Intelligent Platform Management Interface (IPMI) system interfaces, such as a system management interface chip (SMIC) interface or a block transfer (BT) interface. In certain embodiments, the SMIC interface and/or the BT interface can be used to replace one or both of the KCS interface 150 and the USB interface 155. In certain embodiments, data transfer between the host computer 110 and the SP 120 can be in the format of IPMI original equipment manufacturer (OEM) messages, and goes through one of the KCS interface 150 and the USB interface 155.

The host computer 110 may be a computing device, such as a general purpose computer or a headless computer. Generally, the host computer 110 includes a baseboard or the "motherboard" (not shown). The baseboard is a printed circuit board to which a multitude of components or devices may be connected by way of a system bus or other electrical communication paths. Although not explicitly shown in FIG. 1, the components on the baseboard are interconnected, and the layout of the components on the baseboard and the manner of the interconnection between the components on the baseboard is herein referred to as the configuration of the baseboard. One of ordinary skill in the art would appreciate that the configuration of the baseboard may be adjusted or changed according to the necessary design or manufacturing requirements.

The components on the baseboard of the host computer 110 include, but not limited to, a central processing unit (CPU) 112, a memory 114, a BIOS chip 116, and other required memory and Input/Output (I/O) modules (not shown). In certain embodiments, the SP 120 may also be a component on the baseboard. In certain embodiments, the CPU 112, the memory 114, and the BIOS chip 116 may be embedded on the baseboard, or may be connected to the baseboard through at least one interface. In certain embodiments, the interface may be physical hardware interface such as electrical connectors, buses, ports, cables, terminals, or other I/O devices.

Further, the host computer 110 includes a storage device 118, which stores a plurality of software applications, including an operating system (OS) 160. In certain embodiments, the host computer 110 may include at least one I/O device (not shown) for generating and controlling input and output signals of the host computer 110. Examples of the I/O device include keyboards, touch pads, mouse, microphones, display screens, touch screens, or other I/O devices applicable for the host computer 110. Some I/O devices, such as touch screens, are provided for the dual input/output purposes.

The CPU 112 is a host processor which is configured to control operation of the host computer 110. The host processor can execute the OS 160 or other applications of the host computer 110. In certain embodiments, the host computer 110 may run on or more than one CPU as the host processor, such as two CPUs, four CPUs, eight CPUs, or any suitable number of CPUs.

The memory 114 can be a volatile memory, such as the random-access memory (RAM), for storing the data and information during the operation of the host computer 110. In certain embodiments, the memory 114 is in communication with the CPU 112 through a system bus (not shown).

The BIOS chip 116 is one of the most crucial components in the host computer 110 or any computer system. In certain embodiments, the BIOS chip 116 is a non-volatile memory, such as a flash memory chip, an electrically erasable programmable read-only memory (EEPROM) chip or a complementary metal oxide semiconductor (CMOS) memory. As shown in FIG. 1, the BIOS chip 116 stores a BIOS image 170 (hereinafter the BIOS 170), an IPMI application 172, and a flasher module 174.

The BIOS 170 is an image file storing the firmware codes which, when executed at the CPU 112, are configured to perform the startup functions, or the booting functions, for the host computer 110. Examples of the booting functions include, but are not limited to, the initiation and power-on self-test, identifying the system devices, locating the boot loader software on the boot device, loading and executing the boot loader software and giving it control of the OS 160 in the protected mode.

As described above, the BIOS 170 can perform the startup or the booting functions. In the booting process, the BIOS 170 performs a power-on self-test operation, which initializes and identifies the system hardware devices of the host computer 110, such as the CPU 112, the memory 114, the storage device 118, peripheral I/O devices such as display card, keyboard and mouse, and other hardware devices. In certain embodiments, the BIOS 170 may identify the storage device 118, which stores an operating system (OS) 160, as a bootable device. Once the BIOS 170 completes the self-test operation, the BIOS 170 then attempts to boot the host computer 110, i.e., instructs the CPU 112 to read and execute the OS 160 from the bootable device, i.e. the storage device 118 as specified in the BIOS 170. Typically, the BIOS 170 attempts to load a boot loader program from the storage device 118. The boot loader program then loads the OS 160 from the storage device 118. Thus, the CPU 112 can execute the OS 160 and run an instance of the OS 160. At the end of the booting process, the control of the computer system is given to the OS 160.

In certain embodiments, after completing the self-test operation without errors, the BIOS 170 may perform a failover backup process if the SP 120 does not have a newer version of the BIOS image 185. In certain embodiments, when the BIOS 170 completes the self-test operation successfully, the BIOS 170 may send a request to the SP 120 asking for version information of the BIOS image 185 stored in the SP 120. In certain embodiments, the version information may be a timestamp showing the time when the BIOS image 185 was generated, or a version identification number indicating the version of the BIOS image 185. When the SP 120 returns the version information, the BIOS 170 compares the version information of the BIOS image 185 with the current version of the BIOS 170 stored in the BIOS chip 116. If the BIOS 170 determines that the BIOS image 185 stored in the SP 120 is an older version than the BIOS 170, the BIOS 170 sends a copy of the BIOS 170 stored in the BIOS chip 116 to the SP 120 as a failover backup image before loading the OS 160. Upon receiving the copy of the BIOS 170, the SP 120 may store the copy of the BIOS 170 in the memory 122 to replace the BIOS image 185. If there is no BIOS image 185 stored in the SP 120, the SP 120 does not return the version information. When the BIOS 170 waits for a certain period of time without receiving the version information from the SP 120, the BIOS 170 determines that there is no BIOS image stored in the SP 120. The BIOS 170 then sends a copy of the BIOS 170 stored in the BIOS chip 116 to the SP 120 as the failover backup image before loading the OS 160. Upon receiving the copy of the BIOS 170, the SP 120 may store the copy of the BIOS 170 in the memory 122 to form the BIOS image 185.

In certain embodiments, after completing the self-test operation without errors, the BIOS 170 may perform a BIOS flashing process if the SP 120 has a newer version of the BIOS image 185 available. In certain embodiments, when the BIOS 170 completes the self-test operation successfully, the BIOS 170 may send a request to the SP 120 asking for version information of the BIOS image 185 stored in the SP 120. When the SP 120 returns the version information, the BIOS 170 compares the version information of the BIOS image 185 with the current version of the BIOS 170 stored in the BIOS chip 116. If the BIOS 170 determines that the BIOS image 185 stored in the SP 120 is a newer version than the BIOS 170, the BIOS 170 may send a request to the SP 120 asking for a copy of the BIOS image 185. Upon receiving the copy of the BIOS image 185, the BIOS 170 loads and executes the flasher module 174 to perform flashing of the BIOS chip 116.

The IPMI application 172 is a computer program that generates and processes IPMI messages. In certain embodiments, when the BIOS 170 is executed at the CPU 112 in the booting process, the BIOS 170 may send data to the IPMI application 172 for converting the data between IPMI messages and data recognizable by the BIOS 170. For example, during the booting process, the BIOS 170 may generate a notification to be sent to the SP 120 indicating the condition of the booting process, i.e. successful booting or error occurring. In order to send the notification to the SP 120, the BIOS 170 can send data of the notification to the IPMI application 172. Upon receiving the data of the notification, the IPMI application 172 converts the data to an IPMI OEM message representing the notification, and sends the IPMI OEM message back to the BIOS 170. When the BIOS 170 receive the IPMI OEM messages from the SP 120 or any other peripheral devices, the BIOS 170 can send the received IPMI OEM messages to the IPMI application 172. The IPMI application 172 processes the IPMI OEM messages to generate data recognizable by the BIOS 170, and then sends the data back to the BIOS 170 for further process.

In certain embodiments, the IPMI application 172 is separated from the BIOS 170 as an independent program. In certain embodiments, the IPMI application 172 can be a part of the BIOS 170, which is compatible to the IPMI architecture for generating IPMI messages.

The IPMI messages can be transmitted, translated, bussed, and wrapped in a variety of fashions. Generally, an IPMI message can be a request message (generally labeled as "rq") or a response message (generally labeled as "rs"), and has a plurality of fields, including the network function (NetFn) field, the logical unit number (LUN) field, the sequence number (Seq#) field, the command (CMD) field, and the data field.

The NetFn field is a six-bit field that describes the network function of the IPMI message. The IPMI Specification defines certain predefined categories for the NetFn field, and there are reserved codes for OEM expansion. For a request message, the NetFn field is an odd number, and for a response message, the NetFn field is an even number.

The LUN field is a two-digit logical unit number for subaddressing purposes. For low-end integrity servers and computers, the LUN field is always zero.

The Seq# field defines a sequence number in the response message to identify the response message in response to a certain request message. In certain embodiments, the value stored in the Seq# field is the same number as the sequence number appeared in the CMD field of the request message to which the response message is in response. As discussed above, the Seq# field must be provided when the NetFn field is an even number to indicate the IPMI message as a response message.

The CMD field includes the commands of the IPMI message. When the IPMI message is a request message, the CMD field includes a sequence number such that a response message to the request message may include the same sequence number in the Seq# field.

The data field includes all data transferred by the IPMI message. In certain embodiments, the data field of an IPMI message can be 0 bytes. In other words, an IPMI message may contain no data field.

Figure 2:
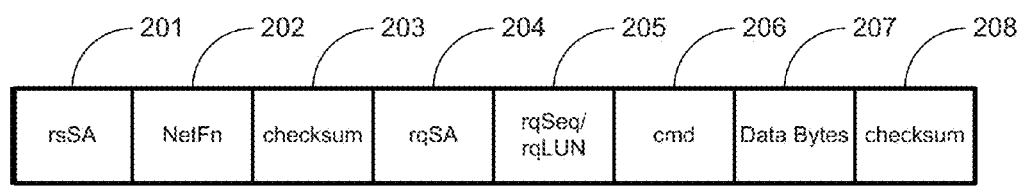
FIG. 2 schematically depicts an IPMI message according to certain embodiments of the present disclosure.

FIG. 2 schematically depicts an IPMI message according to certain embodiments of the present disclosure. As shown in FIG. 2, each block of the IPMI message 200 refers to a field, which may have a different length. The IPMI message 200 includes a plurality of fields, such as the rs slave address (rsSA) field 201, the NetFn field 202, the rq slave address (rqSA) field 204, the rq Seq# (rqSeq)/rqLUN field 205, the command field 206, and the data field 207. Further, a plurality of checksum fields 203 and 208 are included for checksum verification purposes. As discussed above, the data field 207 may contain 0 bytes of data (i.e. no data field) or more than one byte of data.

In certain embodiments, IPMI OEM messages are used for data transaction purposes between the BIOS 170 and the SP 120. When the IPMI application 172 processes data to be transferred to the SP 120 to generate an IPMI OEM message, the data can be stored in the data field 207 of the IPMI OEM message as shown in FIG. 2.

The flasher module 174 is a program to perform flashing of the BIOS image 170 stored in the BIOS chip 116. In certain embodiments, flashing of the BIOS 170 can be performed due to a newer BIOS image 185 available in the SP 120, or due to an error occurring during the booting process. When the BIOS 170 receives a BIOS image for flashing the BIOS chip 116, the BIOS 170 calls the flasher module 174 to perform the flashing process, the flasher module 174 receives instructions from the BIOS 170 and performs flashing functions to flash the BIOS chip 116. In certain embodiments, the flasher module 174 can be a part of the BIOS 170. In certain embodiments, the flasher module 174 can be an independent program separated from the BIOS 170.

In certain embodiments, the flasher module 174 may be stored in a storage media other than the BIOS chip 116. In certain embodiments, the flasher module 174 may be stored in the storage device 118 of the host computer 110. In certain embodiments, the flasher module 174 may be stored as a part of the firmware 126 in the SP 120 such that the SP 120, instead of the BIOS 170, may execute the flasher module 174.

As discussed above, the BIOS chip 116 is a non-volatile memory such as a flash memory chip. Typically, the flash memory stores information in an array of memory cells made from floating-gate transistors, which is different in its nature from other volatile or non-volatile memory because the information or data stored therein must be erased before new data can be written to the memory cells. There are two main types of flash memory: the NAND type and the NOR type, which are respectively named after the NAND and NOR logic gates. The flash memory is divided into in logical blocks. Each block can vary in size, where the most common is 128 KB. In the majority of NAND flash devices each block is made of 64 pages of 2 KB each. A page is divided in two regions: the data area, and the spare area used for memory management purposes. Pages are divided in sector units (or chunks) of 512 byte to emulate the popular sector size (ibid). The block is the smallest erasable unit while the page is the smallest programmable unit.

Figure 3:
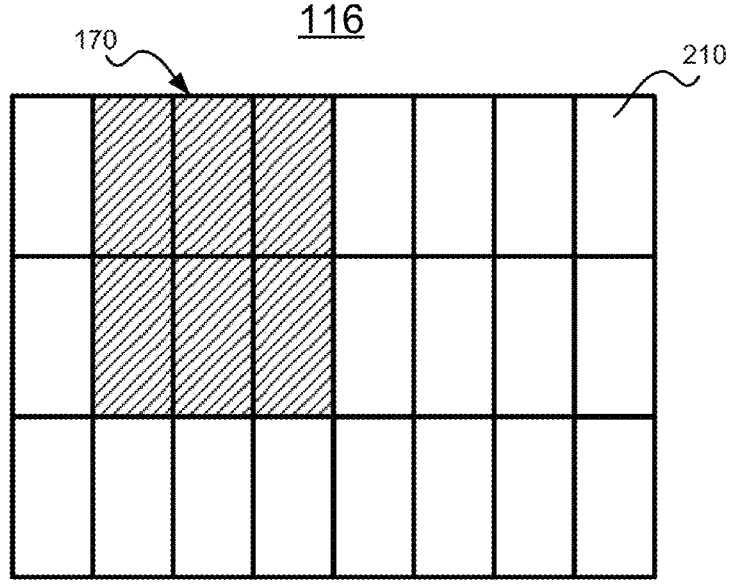
FIG. 3 schematically depicts the BIOS chip storing the BIOS according to certain embodiments of the present disclosure.

FIG. 3 schematically depicts the BIOS chip storing the BIOS according to certain embodiments of the present disclosure. As shown in FIG. 3, the BIOS chip 116 includes a plurality of logical blocks 210, and data of the BIOS 170 is stored in a number of the blocks 210. In certain embodiments, data of the BIOS 170 may be distributed between the blocks 210. In other words, each block 210 may include some data of the BIOS 170 and some empty memory space. It should be appreciated that FIG. 3 shows the blocks 210 in the matrix form solely for the illustration purposes, and the actual memory allocation of the blocks 210 of the BIOS chip 116 may be different.

In certain embodiments, the flasher module 174 utilizes a flash driver (or flash translation layer) to read and write data to the BIOS chip 116. For example, under a Linux system, the executed flasher module 174 generally accesses the flash memory of the BIOS chip 116 through the memory technology device (MTD) subsystem. In certain embodiments, the executed flasher module 174 can mount a file system on top of the MTD subsystem. The flash driver of the MTD subsystem operates a block 210 as the smallest erasable unit. In certain embodiments, a block 210 can have a size of 128K (=131072) bytes. In an erasing or rewriting operation, data in one block 210 must be erased before new data can be rewritten to any sector of the block 210. When a file system is mounted on top of the MTD subsystem, the file system uses sectors (not shown in FIG. 3A) as the basic memory units. The size of a sector is generally 512 or 1024 bytes. A block contains a number of sectors. Data can be written into one or more sectors of a block. Examples of the file system include ext2, ext3, XFS, JFS, FAT, or any other suitable file systems.

Figure 4:
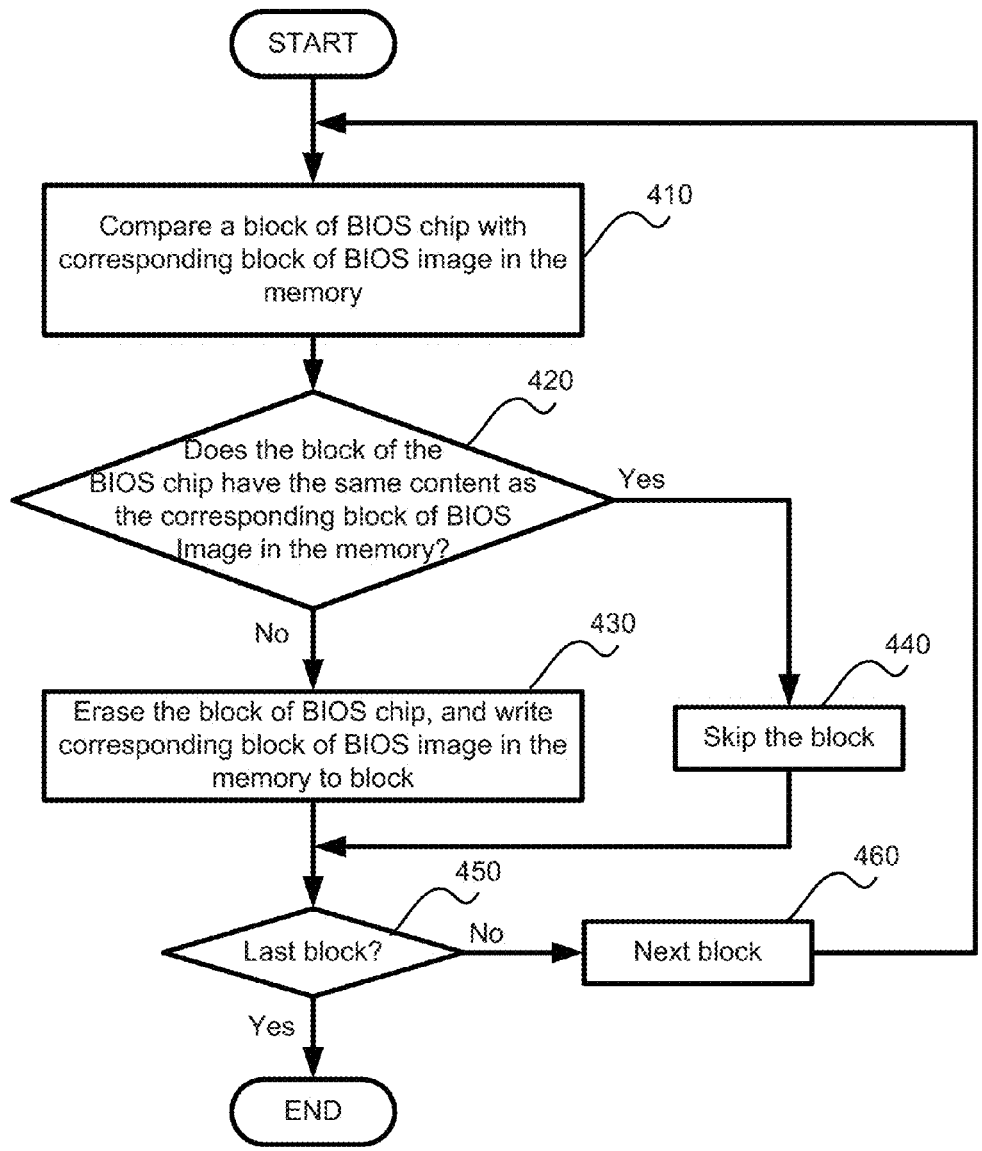
FIG. 4 schematically depicts a flowchart of a flashing process of the BIOS chip according to certain embodiments of the present disclosure.

FIG. 4 schematically depicts a flashing process of the BIOS chip according to certain embodiments of the present disclosure. In certain embodiments, the BIOS 170 has saved a copy of replacement BIOS image in the memory 112, and executes the flasher module 174 to perform the flashing process.

At procedure 410, when the flashing process starts, the flasher module 174 compares one block 210 of the BIOS chip 116 with a corresponding block of the BIOS image stored in the memory 112 to determine whether the two blocks are the same (e.g., include the same content). At procedure 420, if the flasher module 174 determines that the two blocks are different, the flasher module 174 enters procedure 430. If the two blocks are the same, the flasher module 174 enters procedure 440. At procedure 430, the flasher module 174 erases the block 210 of the BIOS chip 116, and writes the corresponding block of the replacement BIOS image to the erased block 210. At procedure 440, the flasher module 174 skips the block 210. In other words, the block 210 of the BIOS chip 116 is not changed if the contents stored in the block 210 are the same to the corresponding block of the BIOS image stored in the memory 112.

After completing a block 210 of the BIOS chip 116, at procedure 450, the flasher module 174 checks if that just compared block 210 is the last block of the BIOS chip 116. If the block 210 is the last block, the flashing process is completed. If there are other blocks waiting to be operated, the flasher module 174 enters procedure 460 to go back to procedure 410 to operate on the next block 210. In this way, the flasher module 174 processes through all the blocks 210 of the BIOS chip 116. When the flashing process is completed, the flasher module 174 may return control to the BIOS 170, and the BIOS 170 may restart the host computer 110.

The storage device 118 is a non-volatile data storage media for storing the OS 160, the IPMI application 172, and other applications of the host computer 110. Examples of the storage device 118 may include flash memory, memory cards, USB drives, hard drives, floppy disks, optical drives, or any other types of data storage devices.

The OS 160 can be collective management software managing the operation of the host computer 110. For example, the OS 160 can include a set of functional programs that control and manage operations of the devices connected to the host computer 110. The set of application programs provide certain utility software for the user to manage the host computer 110. In certain embodiments, the OS 160 is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc. In certain embodiments, the OS 160 can also be compatible to the IPMI architecture for generating IPMI messages in order to communicate with the SP 120.

The SP 120 is a specialized microcontroller that manages the interface between system management software and platform hardware. In certain embodiments, the SP 120 may be a baseboard management controller (BMC). Different types of sensors can be built into the host computer 110, and the SP 120 reads these sensors to obtain parameters such as temperature, cooling fan speeds, power status, OS status, etc.

The SP 120 monitors the sensors and can send out-of-band (OOB) alerts to a system administrator of the host computer 110 if any of the parameters do not stay within preset limits, indicating a potential failure of the host computer 110. In certain embodiments, the administrator can also remotely communicate with the SP 120 from a remote management computer via a network to take remote action to the host computer. For example, the administrator may reset the host computer 110 from the remote management computer through the SP 120, and may obtain system information of the host computer 110 OOB without interrupting the operation of the host computer 110.

As shown in FIG. 1, the SP 120 includes a processor 121, a memory 122 and a non-volatile memory 124. In certain embodiments, the SP 120 does not have direct access through the SPI to the BIOS chip 116 of the host computer 110. In certain embodiments, the SP 120 may include other components, such as at least one I/O device (not shown).

The processor 121 controls operation of the SP 120. The processor 121 can execute the firmware 126 or other codes stored in the SP 120. In certain embodiments, the SP 120 may run on or more than one processor.

The memory 122 can be a volatile memory, such as the RAM, for storing the data and information during the operation of the SP 120. When the SP 120 restarts, the contents stored in the memory 122 will be lost.

In certain embodiments, the memory 122 is configured to store a copy of BIOS image 185. The BIOS image 185 is a copy of BIOS image file storing in the memory 122 of the SP 120. In certain embodiments, the BIOS image 185 contains the version information of the BIOS image 185. In certain embodiments, the version information may be a timestamp showing the time when the BIOS image 185 was generated, or a version identification number indicating the version of the BIOS image 185.

In certain embodiments, the SP 120 receives a copy of the BIOS image 185 from the remote management computer 140 via the network 130, and store the BIOS image in the memory 122. Since the memory 122 is volatile, the BIOS image 185 will be lost if the SP 120 restarts.

The non-volatile memory 124 stores the firmware 126 of the SP 120. The firmware 126 of the SP 120 includes computer executable codes for performing the operation of the SP 120. As shown in FIG. 1, the firmware 126 of the SP 120 includes, among other things, a BIOS update module 180 and an IPMI module 190. Optionally, the firmware 126 may also include a watchdog module (not shown) for monitoring operation of the host computer 110. In certain embodiments, the firmware 126 may include a web connection module (not shown) for communication with the network 130 such that the administrator of the computer system may connect to the SP 120 remotely from the remote management computer 140 via the network 130.

The BIOS update module 180 controls the transmission of the BIOS image between the SP 120 and the host computer 110 via the system interface, such as the KCS interface 150 or the USB interface 155. In certain embodiments, when the BIOS 170 sends a request for the version information of the BIOS image 185 to the SP 120, the BIOS update module 180 may retrieve version information of the BIOS image 185 from the memory 122, and send version information of the BIOS image 185 to the firmware 126 such that the firmware 126 may send the version information to the BIOS 170 at the host computer 110 for comparing of the version of the BIOS images. In certain embodiments, when the BIOS 170 sends a request to the BIOS update module 180 for the BIOS image 185, the BIOS update module 180, in response to the request, retrieves a copy of the BIOS image 185 from the memory 122, and sends the copy of the BIOS image 185 to the firmware 126 such that the firmware 126 may send the copy of the BIOS image 185 to the BIOS chip 116 to replace the BIOS 170 stores in the BIOS chip 116. In certain embodiments, when the BIOS 170 sends a copy of the BIOS 170 to the SP 120, the firmware 126 receives the copy of the BIOS 170 and sends the copy of the BIOS 170 to the BIOS update module 180. The BIOS update module 180 then saves the copy of the BIOS 170 in the memory 122 to replace or to form the BIOS image 185. In certain embodiments, when the remote management computer 140 sends a copy of the BIOS image to the SP 120 via the network 130, the firmware 126 receives the copy of the BIOS image and sends the copy of the BIOS image to the BIOS update module 180. The BIOS update module 180 then saves the copy of the BIOS image in the memory 122 to form the BIOS image 185.

It should be noted that the operation of the BIOS update module 180 is independent from the state of the host computer 110. In other words, the BIOS update module 180 enables the OOB update of the BIOS 170 in the BIOS chip 116.

The IPMI module 190 is a program of the SP 120 to generate and process IPMI messages. In certain embodiments, when the firmware 126 of the SP 120 generates data to be transferred to the host computer 110 under the IPMI architecture, the firmware 126 sends the data to the IPMI module 190. Upon receiving the data, the IPMI module 190 converts the data to corresponding IPMI OEM messages, and sends the IPMI OEM messages back to the firmware 126 such that the firmware 126 may send the IPMI OEM messages to the host computer 110. When the firmware 126 receives IPMI OEM messages from the host computer 110 or any other IPMI compatible devices, the firmware 126 sends the received IPMI OEM messages to the IPMI module 190. The IPMI module 190 processes the IPMI OEM messages to generate data recognizable by the firmware 126, and then sends the data back to the firmware 126 for further process. In certain embodiments, the IPMI module 190 can be a similar program to the IPMI application 172 at the host computer 110.

Currently, almost all firmware of SP's or BMC's available in the market supports the IPMI architecture, and provide a variety of IPMI modules 190. In certain embodiments, the IPMI module 190 can be a part of the firmware 126, which is compatible to the IPMI architecture for generating IPMI messages. In certain embodiments, the IPMI module 190 is separated from the firmware 126 as an independent program.

In certain embodiments, IPMI OEM messages are used for data transaction purposes between the BIOS 170 and the SP 120. When the IPMI module 190 processes data to be transferred to the host computer 110 to generate an IPMI OEM message, the data can be stored in the data field 207 of the IPMI OEM message as shown in FIG. 2.

The KCS interface 150 is a standardized interface often used between a SP and a payload processor in the IPMI architecture. IPMI is an industry standard for system monitoring and event recovery. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a SP through an operating system or through an external connection, such as through a network or serial connection. Additional details regarding IPMI can be found in the IPMI Specification (Version 2.0), which is publicly available from INTEL CORPORATION, and which is incorporated herein by reference.

In certain embodiments, in addition to the standard predefined commands and parameters, IPMI allows OEM extensions for the manufacturers and users to define OEM specific commands. A user may use IPMI OEM messages to control data transmission via the KCS interface 150. The IPMI OEM messages may be used for the data transaction between the host computer 110 and the SP 120. In certain embodiments, the IPMI OEM messages may include the specific data to be transferred, or the request for the specific data.

The USB interface 155 is an industry standardized interface under the USB industry standard that defines the cables, connectors and communications protocols used in a bus for connection, communication, and power supply between computers and electronic devices. In certain embodiments, the USB interface 155 is a USB port.

USB has effectively replaced a variety of earlier interfaces, such as serial and parallel ports, as well as separate power chargers for portable devices. Currently, USB allows bi-directional communications between the host computer 110 and the SP 120, as USB 3.0 allows for device-initiated communications towards the host.

In certain embodiments, the USB interface 155 may be used to transfer IPMI OEM messages between the host computer 110 and the SP 120. In certain embodiments, when the SP 120 is connected to the host computer 110 via the USB interface 155, the OS 160 may request and receive a plurality of USB descriptors from the SP 120 through the USB interface 130. Based on information of the USB descriptors, the OS 160 may recognize the BMC 120 as the specific USB human interface device (HID) device, and recognize a predefined format of a USB HID report for transferring data to the specific HID device (i.e. the BMC 120). In certain embodiments, the USB HID report is in the predefined format based on the information of the USB descriptors with the IPMI OEM messages embedded therein. Thus, the IPMI OEM messages can be transferred between the host computer 110 and the SP 120 through the USB interface 155 by transferring the USB HID reports with the IPMI OEM messages embedded therein.

The remote management computer 140 can be a local mobile device serving as the client device of the system 100, which is subject to receive actions from the user. As shown in FIG. 1, the remote management computer 140 is remotely connected to the SP 120 via the network 130. One of ordinary skill in the art would appreciate that the system 100 may include a plurality of remote management computer 140. Examples of the remote management computer 140 may include, for example, portable devices such as smartphones, tablets or other mobile computer devices. Although not explicitly shown in FIG. 1, the remote management computer 140 may have a baseboard with a CPU and a memory embedded thereon, a storage device and at least one I/O device, such that the remote management computer 140 is operable independently without being connected to the SP 120 of the host computer 110.

In certain embodiments, an administrator of the system 100 may access the SP 120 from the remote management computer 140 via the network 130. When the administrator obtains a BIOS image file from another host computer, the administrator may upload the BIOS image file to the SP 120 from the remote management computer 140 via the network 130 such that the SP 120 may use the BIOS image file to generate the BIOS image 185 in the memory 122.

In certain embodiments, the SP 120 receives a copy of the BIOS image 185 from the remote management computer 140 via the network 130, and store the BIOS image in the memory 122.

Figure 5:
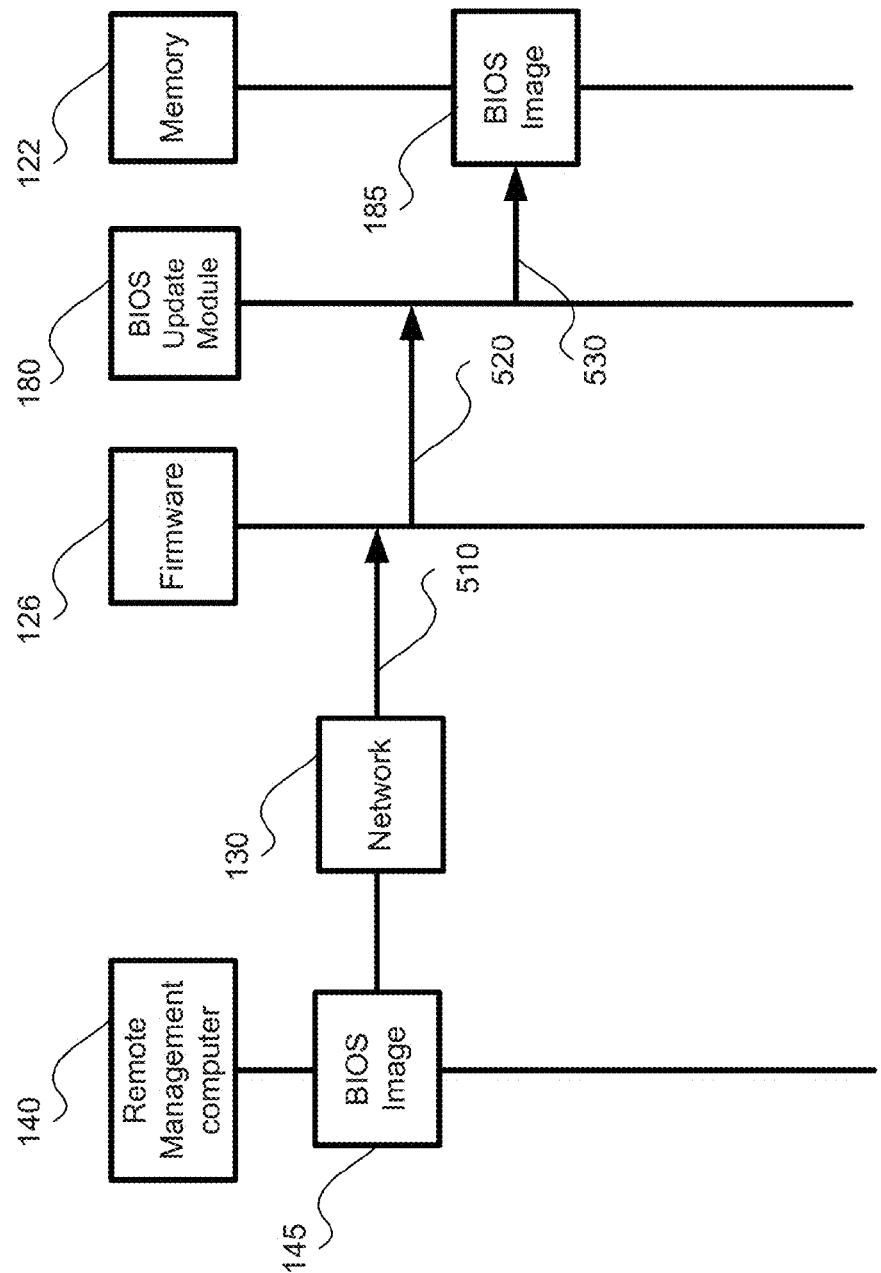
FIG. 5 schematically depicts a SP receiving a BIOS image from a remote management computer according to certain embodiments of the present disclosure.

FIG. 5 schematically depicts a SP receiving a BIOS image from a remote management computer according to certain embodiments of the present disclosure. At procedure 510, the administrator of the system 100 uploads a BIOS image file 145 to the SP 120 from the remote management computer 140 via the network 130. Upon receiving the BIOS image file 145, at procedure 520, the firmware 126 calls the BIOS update module 180. At procedure 530, the BIOS update module 180 stores the received BIOS image file 145 in the memory 122 to form the BIOS image 185. In certain embodiments, when the memory 122 already has a BIOS image 185 stored therein, the BIOS update module 180 replaces the BIOS image 185 with the received BIOS image file 145. In certain embodiments, the BIOS image 185 contains the version information.

In certain embodiments, the SP 120 does not have the access to the SPI 158 to directly connect to the BIOS chip 116 of the host computer 110. In this case, the BIOS 170, when executed at the CPU 112 during the booting process, may initiate a flashing process of the BIOS chip 116. For example, when the administrator of the system 100 uploads a BIOS image file to the SP 120 from the remote management computer 140 via the network 130, the SP 120 has a BIOS image 185 stored in the memory 122, and the BIOS image 185 is newer than the BIOS 170 stored in the BIOS chip 116 of the host computer 110. Thus, during the next booting process of the host computer, the BIOS 170, when executed at the CPU 112, may request for the BIOS image 185 to perform the flashing process.

Figure 6A:
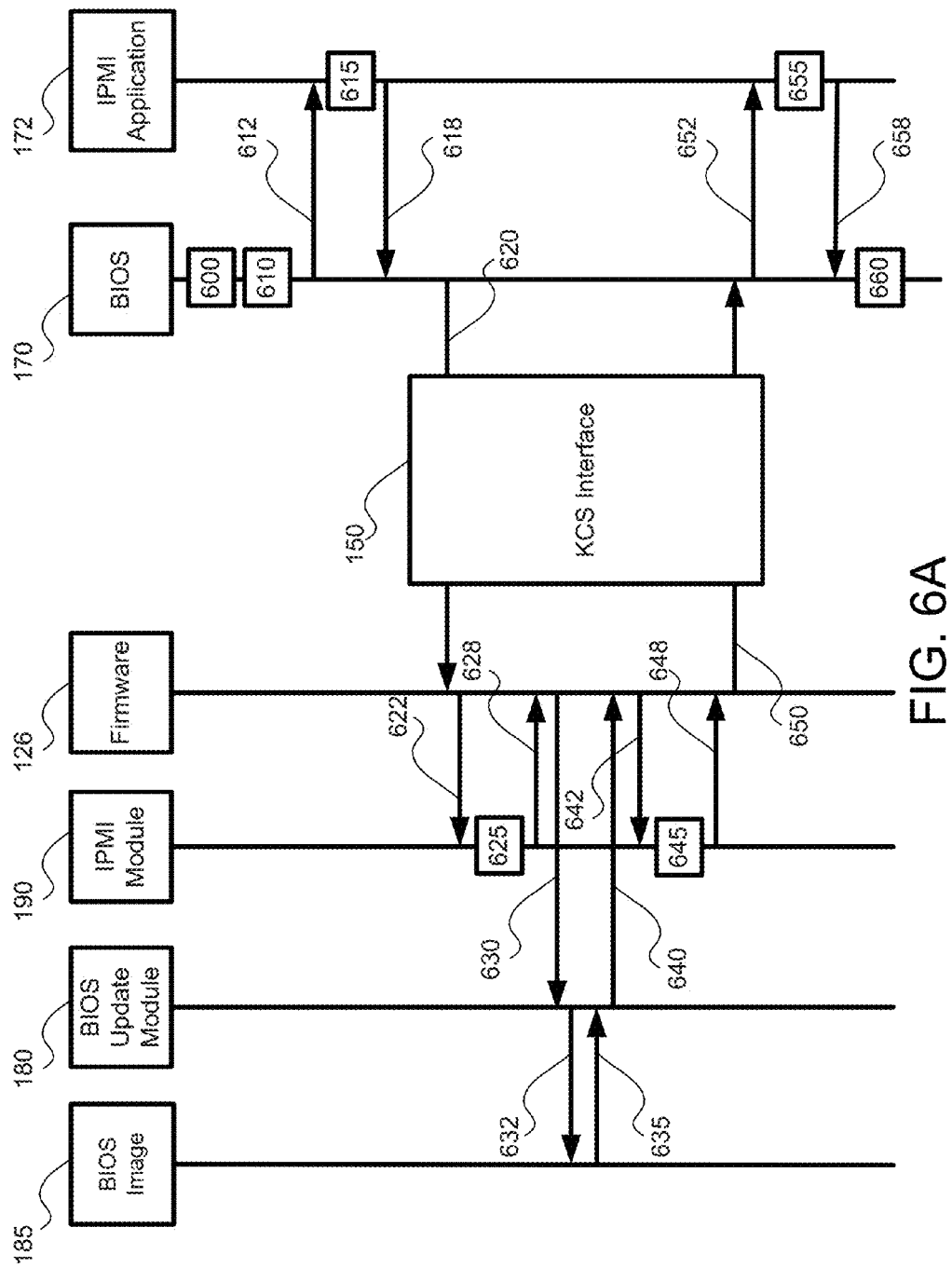
FIGS. 6A and 6B schematically depict a BIOS flashing process initiated by the executed BIOS at the host computer when the SP has no SPI access to the BIOS chip according to certain embodiments of the present disclosure.
Figure 6B:
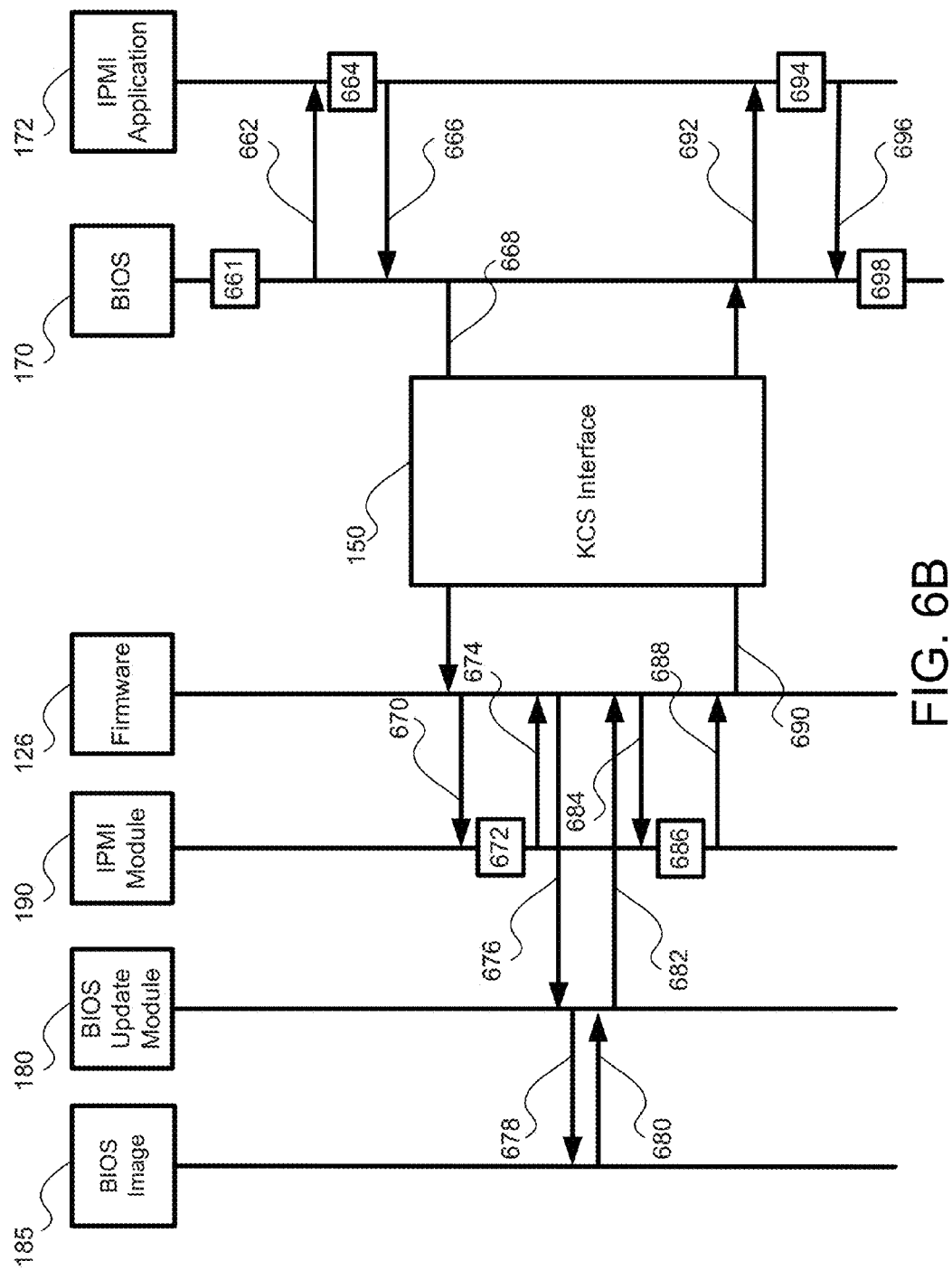

FIGS. 6A and 6B schematically depict a BIOS flashing process initiated by the executed BIOS at the host computer when the SP has no SPI access to the BIOS chip according to certain embodiments of the present disclosure. In certain embodiments, the BIOS image 185 stored in the SP 120 is obtained from the remote management computer 140 via the network 130, as described with reference to FIG. 5.

Referring to FIG. 6A, at procedure 600, the host computer 110 loads and executes the BIOS 170 to start booting. At procedure 610, during the booting process, the BIOS 170 generates a request for the version information of the BIOS image 185 stored in the SP 120. At procedure 612, the BIOS 170 sends the request to the IPMI application 172 for processing. Upon receiving the request, at procedure 615, the IPMI application 172 converts the request to generate the IPMI OEM message. At procedure 618, the IPMI application 172 sends the IPMI OEM message back to the BIOS 170.

At procedure 620, the BIOS 170 sends the IPMI OEM message representing the request for the version information to the SP 120 through the KCS interface 150. It should be appreciated that the IPMI OEM message can be sent to the SP 120 through the USB interface 155 or any other system interfaces.

When the SP 120 receives the IPMI OEM message representing the request for the version information, at procedure 622, the firmware 126 of the SP 120 sends the IPMI OEM message to the IPMI module 190 for processing. Upon receiving the IPMI OEM message, at procedure 625, the IPMI module 190 converts the IPMI OEM message to generate the request, which is recognizable by the firmware 126. At procedure 628, the IPMI module 190 sends the request for the version information back to the firmware 126.

Upon receiving the request for the version information, at procedure 630, the firmware 126 calls the BIOS update module 180. At procedure 632, in response to the request, the BIOS update module 180 checks the BIOS image 185 stored in the memory 122, and at procedure 635, the BIOS update module 180 retrieves the version information of the BIOS image 185 stored in the memory 122. At procedure 640, the BIOS update module 180 sends the version information back to the firmware 126.

At procedure 642, the firmware 126 sends the version information to the IPMI module 190 for processing. Upon receiving the version information, at procedure 645, the IPMI module 190 converts the version information to generate another IPMI OEM message. At procedure 648, the IPMI module 190 sends the IPMI OEM message representing the version information back to the firmware 126.

At procedure 650, the firmware 126 sends the IPMI OEM message representing the version information to the BIOS 170 executed at the host computer 110 through the KCS interface 150. It should be appreciated that the IPMI OEM message can be sent to the BIOS components 176 through the USB interface 155 or any other system interfaces.

When the host computer 110 receives the IPMI OEM message representing the version information, at procedure 652, the BIOS 170 sends the IPMI OEM message to the IPMI application 172 for processing. Upon receiving the IPMI OEM message, at procedure 655, the IPMI application 172 converts the IPMI OEM message to generate the version information, which is recognizable by the BIOS 170. At procedure 658, the IPMI application 172 sends the version information back to the BIOS 170.

At procedure 660, the BIOS 170 compares the version information of the BIOS image 185 to the version of the BIOS 170. Since the BIOS image 185 stored in the SP 120 is obtained from the remote management computer 140 via the network 130, the version information indicates that the BIOS image 185 is a newer image than the BIOS 170. Thus, the BIOS 170 generates a request for the BIOS image 185 stored in the SP 120.

Referring to FIG. 6B, the requesting process for the BIOS image 185 is similar to the requesting process for the version information as described in procedures 610 to 660. Specifically, at procedure 661, the BIOS 170 generates a request for the BIOS image 185 stored in the SP 120. At procedure 662, the BIOS 170 sends the request to the IPMI application 172 for processing. Upon receiving the request, at procedure 664, the IPMI application 172 converts the request to generate the IPMI OEM message. At procedure 666, the IPMI application 172 sends the IPMI OEM message back to the BIOS 170.

At procedure 668, the BIOS 170 sends the IPMI OEM message representing the request for the BIOS image 185 to the SP 120 through the KCS interface 150. It should be appreciated that the IPMI OEM message can be sent to the SP 120 through the USB interface 155 or any other system interfaces.

When the SP 120 receives the IPMI OEM message representing the request for the BIOS image 185, at procedure 670, the firmware 126 of the SP 120 sends the IPMI OEM message to the IPMI module 190 for processing. Upon receiving the IPMI OEM message, at procedure 672, the IPMI module 190 converts the IPMI OEM message to generate the request, which is recognizable by the firmware 126. At procedure 674, the IPMI module 190 sends the request for the BIOS image 185 back to the firmware 126.

Upon receiving the request for the BIOS image 185, at procedure 676, the firmware 126 calls the BIOS update module 180. At procedure 678, in response to the request, the BIOS update module 180 checks the BIOS image 185 stored in the memory 122, and at procedure 680, the BIOS update module 180 retrieves a copy of the BIOS image 185 stored in the memory 122. At procedure 682, the BIOS update module 180 sends the copy of the BIOS image 185 back to the firmware 126.

At procedure 684, the firmware 126 sends the copy of the BIOS image 185 to the IPMI module 190 for processing. Upon receiving the copy of the BIOS image 185, at procedure 686, the IPMI module 190 converts the copy of the BIOS image 185 to generate another IPMI OEM message. At procedure 688, the IPMI module 190 sends the IPMI OEM message representing the copy of the BIOS image 185 back to the firmware 126.

At procedure 690, the firmware 126 sends the IPMI OEM message representing the copy of the BIOS image 185 to the BIOS 170 executed at the host computer 110 through the KCS interface 150. It should be appreciated that the IPMI OEM message can be sent to the BIOS components 176 through the USB interface 155 or any other system interfaces.

When the host computer 110 receives the IPMI OEM message representing the copy of the BIOS image 185, at procedure 692, the BIOS 170 sends the IPMI OEM message to the IPMI application 172 for processing. Upon receiving the IPMI OEM message, at procedure 694, the IPMI application 172 converts the IPMI OEM message to generate the copy of the BIOS image 185, which is recognizable by the BIOS 170. At procedure 696, the IPMI application 172 sends the copy of the BIOS image 185 back to the BIOS 170.

Upon receiving the copy of the BIOS image 185, at procedure 698, the BIOS 170 stores the copy of the BIOS image 185 in the memory 114, and calls the flasher module 174 to perform flashing of the BIOS chip 116. The process of flashing the BIOS chip 116 has been described with reference to FIG. 4, and is hereinafter not repeated.

Once the BIOS 170 completes flashing the BIOS chip 116, the BIOS 170 may restart the host computer 110 such that the host computer 110 will reboot with the new BIOS image 170.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
 a service processor (SP), comprising a processor, a non-volatile memory, a volatile memory and a system interface, wherein the non-volatile memory stores computer executable codes, and the codes are configured to, when executed at the processor,
  receive a basic input/output system (BIOS) image from a remote management computer, and store the BIOS image in the volatile memory;
  receive, from a BIOS being executed at a central processing unit (CPU) of a host computer through the system interface, a request for the BIOS image stored in the volatile memory, wherein the request for the BIOS image is a first IPMI original equipment manufacturer (OEM) message generated by the BIOS being executed at the CPU of the host computer; and
  in response to the request for the BIOS image, send a copy of the BIOS image stored in the volatile memory to the host computer through the system interface such that the BIOS being executed at the CPU of the host computer receives the copy of the BIOS image and replaces a current BIOS image stored in a BIOS chip of the host computer with the copy of the BIOS image.

2. The system as claimed in claim 1, wherein the system interface is a standardized interface under an Intelligent Platform Management Interface (IPMI) standard, wherein the standardized interface comprises a keyboard controller style (KCS) interface, a system management interface chip (SMIC) interface, and a block transfer (BT) interface.

3. The system as claimed in claim 1, wherein the system interface is a universal serial bus (USB) interface.

4. The system as claimed in claim 1, wherein the SP is a baseboard management controller (BMC).

5. The system as claimed in claim 1, wherein the host computer comprises:
 the BIOS chip storing the current BIOS image;
 a memory; and
 the CPU, configured to load a copy of the current BIOS image to the memory and execute the current BIOS image as the BIOS;
 wherein the BIOS, when executed at the CPU, is configured to
  generate the first IPMI OEM message as the request for the BIOS image, and send the request for the BIOS image to the SP via the system interface;

receive the copy of the BIOS image from the SP via the system interface, and stores the copy of the BIOS image in the memory; and replace the current BIOS image stored in the BIOS chip with the copy of the BIOS image stored in the memory.

6. The system as claimed in claim 5, wherein the BIOS, when executed at the CPU, is configured to receive the copy of the BIOS image from the SP by:

receiving a second IPMI OEM message from the SP via the system interface; and retrieving the copy of the BIOS image from the second IPMI OEM message.

7. The system as claimed in claim 6, wherein the codes are configured to send the copy of the BIOS image to the host computer by:

generating the second IPMI OEM message comprising the copy of the BIOS image; and sending the second IPMI OEM message to the host computer via the system interface.

8. The system as claimed in claim 5, wherein the BIOS, when executed at the CPU, is further configured to:

generate a request for version information of the BIOS image, and send the request for the version information of the BIOS image to the SP through the system interface;

receive, from the SP via the system interface, the version information of the BIOS image; and compare the version information of the BIOS image to a version information of the current BIOS image.

9. The system as claimed in claim 8, wherein the codes are further configured to:

receive, from the BIOS being executed at the CPU of the host computer through the system interface, the request for the version information of the BIOS image;

in response to the request for the version information, retrieve the version information from the BIOS image stored in the volatile memory; and send the version information to the host computer via the system interface.

10. The system as claimed in claim 8, wherein the request for the version information of the BIOS image is a third IPMI OEM message, and the version information of the BIOS image is a fourth IPMI OEM message.

11. A method of updating a basic input/output system (BIOS) of a host computer with a service processor (SP), comprising:

receiving, at the SP, a BIOS image from a remote management computer, and storing the BIOS image in a volatile memory of the SP;

receiving, at the SP, a request for the BIOS image stored in the volatile memory from a BIOS being executed at a central processing unit (CPU) of the host computer through a system interface, wherein the request for the BIOS image is a first IPMI original equipment manufacturer (OEM) message generated by the BIOS being executed at the CPU of the host computer; and in response to the request for the BIOS image, sending, at the SP, a copy of the BIOS image stored in the volatile memory to the host computer through the system interface such that the BIOS being executed at the CPU of the host computer receives the copy of the BIOS image and replaces a current BIOS image stored in a BIOS chip of the host computer with the copy of the BIOS image.

12. The method as claimed in claim 11, wherein the SP is a baseboard management controller (BMC).

13. The method as claimed in claim 11, wherein the SP is configured to send the copy of the BIOS image to the host computer by:

generating a second IPMI OEM message comprising the copy of the BIOS image; and sending the second IPMI OEM message to the host computer via the system interface.

14. The method as claimed in claim 11, further comprising:

receiving, at the SP, a third IPMI OEM message as a request for the version information of the BIOS image from the BIOS being executed at the CPU of the host computer through the system interface;

in response to the request for the version information, retrieving, at the SP, the version information from the BIOS image stored in the volatile memory; and sending, at the SP, the version information as a fourth IPMI OEM message to the host computer via the system interface.

15. A non-transitory computer readable medium storing computer executable codes, wherein the codes, when executed at a processor, are configured to receive a basic input/output system (BIOS) image from a remote management computer, and store the BIOS image in a volatile memory of a service processor (SP);

receive a request for the BIOS image stored in the volatile memory from a BIOS being executed at a central processing unit (CPU) of a host computer through a system interface, wherein the request for the BIOS image is a first IPMI original equipment manufacturer (OEM) message generated by the BIOS being executed at the CPU of the host computer; and in response to the request for the BIOS image, send a copy of the BIOS image stored in the volatile memory to the host computer through the system interface such that the BIOS being executed at the CPU of the host computer receives the copy of the BIOS image and replaces a current BIOS image stored in a BIOS chip of the host computer with the copy of the BIOS image.

16. The non-transitory computer readable medium as claimed in claim 15, wherein the SP is a baseboard management controller (BMC).

17. The non-transitory computer readable medium as claimed in claim 15, wherein the codes are configured to send the copy of the BIOS image to the host computer by:

generating a second IPMI OEM message comprising the copy of the BIOS image; and sending the second IPMI OEM message to the host computer via the system interface.

18. The non-transitory computer readable medium as claimed in claim 15, wherein the codes are further configured to receive a third IPMI OEM message as a request for the version information of the BIOS image from the BIOS being executed at the CPU of the host computer through the system interface;

in response to the request for the version information, retrieve the version information from the BIOS image stored in the volatile memory of the SP; and sending the version information as a fourth IPMI OEM message from the SP to the host computer via the system interface.

* * * * *